(12) United States Patent
Katsuki et al.

(10) Patent No.: US 6,911,973 B2
(45) Date of Patent: Jun. 28, 2005

(54) TOUCH PANEL DEVICE

(75) Inventors: Takashi Katsuki, Kawasaki (JP);
Fumihiko Nakazawa, Kawasaki (JP);
Satoshi Sano, Kawasaki (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 446 days.

(21) Appl. No.: 09/985,527

(22) Filed: Nov. 5, 2001

(65) Prior Publication Data

US 2003/0011577 A1 Jan. 16, 2003

(30) Foreign Application Priority Data

Jul. 16, 2001 (JP) ........................................ 2001-215034

(51) Int. Cl.[7] ................................................ G09G 5/00
(52) U.S. Cl. ................. 345/177; 178/18.04; 310/313 R
(58) Field of Search ................................ 345/173–178; 178/18.04–18.11, 19.01–19.07, 20.01–20.04; 310/313 A, 313 R, 313 B, 313 C, 313 D

(56) References Cited

U.S. PATENT DOCUMENTS

| 4,456,847 | A | * | 6/1984 | Minagawa et al. ..... 310/313 R |
| 5,717,434 | A | | 2/1998 | Toda |
| 5,852,261 | A | * | 12/1998 | Toda ........................ 178/18.04 |
| 5,854,450 | A | * | 12/1998 | Kent ........................ 178/18.04 |
| 5,886,452 | A | * | 3/1999 | Toda ........................ 310/313 R |
| 6,590,569 | B1 | * | 7/2003 | Toda ............................ 345/173 |

FOREIGN PATENT DOCUMENTS

| DE | 40 11 978 A1 | 10/1990 | |
| DE | 4011978 | * 10/1990 | ............ H03H/9/25 |
| EP | 0 397 539 | 11/1990 | |
| JP | 358033783 A | * 2/1983 | ........... G06K/11/06 |
| JP | 360140325 A | * 7/1985 | ............. G02F/1/33 |

OTHER PUBLICATIONS

PTO 04–0802: English Translation of Shiba, DE 4011978, Oct. 1990, translated Dec. 2003 by FLS, Inc.*
European Search report dated Aug. 8, 2003 in corresponding European Patent Office Application No. EP 01 30 9504.

* cited by examiner

*Primary Examiner*—Dennis-Doon Chow
*Assistant Examiner*—Leland R. Jorgensen
(74) *Attorney, Agent, or Firm*—Westerman, Hattori, Daniels & Adrian, LLP

(57) ABSTRACT

A touch panel device is provided that can detect a touched position with sufficient resolution and accuracy without requiring high accuracy in process for forming a piezoelectric thin film. In the middle portion of the glass substrate, a substantially rectangular touch area is provided. In the periphery of the touch area, plural transmission comb electrodes arranged along one of the neighboring sides of the touch area and plural reception comb electrodes arranged along the other of the neighboring sides make pairs. Surface acoustic wave signals propagate from the transmission comb electrodes to the reception comb electrodes in a slanting direction with respect to four sides of the touch area. The inside edge of the piezoelectric thin film is formed linearly along the sides of the touch area. Each of the comb electrodes 13 and 14 are arranged so that the line along the electrode finger of the transmission comb electrode and the line along the electrode finger of the reception comb electrode are non-parallel with each other in accordance with an angle of refraction of the surface acoustic wave at the boundary between the piezoelectric thin film and the touch area.

6 Claims, 10 Drawing Sheets

(A)

(B)

TOUCH PANEL DEVICE

BACKGROUND OF THE INVENTION

1. Field of the Invention

The present invention relates to a touch panel device that can be used as an input device for equipment such as a personal computer. More specifically, the present invention relates to a touch panel device having plural pairs of surface acoustic wave transmission elements and reception elements, each of which includes a comb electrode and a piezoelectric thin film, for detecting a touched position.

2. Description of the Prior Art

Such a touch panel device can provide a user-friendly input interface being combined with a display device such as a CRT or an LCD. For example, a command input or selection can be performed easily by touching a button or an icon displayed on a screen of the display device.

FIG. 9 shows a simplified structure of a conventional touch panel device utilizing a surface acoustic wave (also referred to as "SAW"). On the middle portion of a substrate 51 such as a glass plate, a rectangular area 52 is provided as a touch area, around which plural pairs (ten pairs in FIG. 9) of comb electrodes 53 and 54 are arranged. The comb electrodes 53 that made up the SAW transmission elements are disposed along the upper side and the left side of the rectangular area 52, while the comb electrodes 54 that made up the SAW reception elements are disposed along the lower side and the right side of the rectangular area 52.

A piezoelectric thin film 55 is formed in the area of the comb electrodes 53 and 54 around the rectangular area 52. The piezoelectric thin film 55, which is a zinc oxide thin film, for example, is formed so as to cover the substrate 51 and the comb electrodes 53 and 54 formed on the substrate 51. Alternatively, the piezoelectric thin film 55 is formed on the substrate 51, and the comb electrodes 53 and 54 are formed on the piezoelectric thin film 55.

When predetermined amplitude of excitation voltage is applied across the electrodes of the transmission comb electrode 53, a surface acoustic wave signal is generated. This surface acoustic wave signal propagates on the piezoelectric thin film 55 and the substrate 51 toward the corresponding reception element including the comb electrode 54 and the piezoelectric thin film 55, as shown by a line with an arrow. Then, a reception voltage signal is outputted from the comb electrode 54 of the reception element.

If a finger touches a certain position on the surface of the substrate 51 in the rectangular area 52 where surface acoustic wave signals propagate as shown by the lines with arrows, the propagation of the surface acoustic wave signal is intercepted. As a result, the amplitude of the reception voltage signal obtained from the comb electrode 54 of the reception element is attenuated substantially. Thus, in the conventional device shown in FIG. 9, a touched state or a non-touched state (i.e., a touched position) on the surface of the substrate 51 can be detected for 25 positions, which are intersections of five vertical propagation paths and five horizontal propagation paths as shown by lines with arrows.

FIG. 10 shows a simplified structure of another conventional touch panel device, in which a pair of the transmission comb electrode 53 and the reception comb electrode 54 are placed on the neighboring sides of the rectangular area 52 instead of the opposing sides thereof. Therefore, the surface acoustic wave signals propagate from the transmission comb electrode 53 to the reception comb electrode 54 in a slanting direction (in the diagonal direction of the rectangular area 52). For this reason, the comb electrodes 53 and 54 facing each other are arranged in a slanting direction with respect to four sides of the rectangular area 52.

In this way, the distance between the neighboring comb electrodes can be shortened for increasing a resolution of the touch panel compared with the structure shown in FIG. 9, using the same size of the comb electrodes 53 and 54. In addition, since the comb electrode pairs 53 and 54 have different propagation path lengths (i.e., different propagation times), the reception comb electrodes 54 receive the surface acoustic wave signal at different timings even if the plural transmission comb electrodes 53 are excited simultaneously. Thus, the difference of the propagation time among the propagation paths can be utilized for detecting a touched position.

However, the structure shown in FIG. 10 has a disadvantage. A contour of the piezoelectric thin film 55 formed in the area of the comb electrodes 53 and 54 around the rectangular area 52 becomes complicated. With the structure shown in FIG. 9, the inside edge of the piezoelectric thin film 55 can be linear along the four sides of the rectangular area 52. However, in the structure shown in FIG. 10, the inside edge of the piezoelectric thin film 55 should be shaped zigzag (step-like) along the contour of the comb electrodes 53 and 54 that are placed in a slanting direction with respect to the four sides of the rectangular area 52.

In any case, the edge of the piezoelectric thin film 55 must be perpendicular to the propagation path between the pair of comb electrodes 53 and 54. Otherwise, a refraction is generated due to the difference of a propagation speed of the surface acoustic wave at the boundary between the area with the piezoelectric thin film 55 and the area without the piezoelectric thin film 55 (i.e., the area of the substrate 51), so that the surface acoustic wave signal cannot propagate efficiently from the transmission comb electrode 53 to the opposite reception comb electrode 54.

In order to improve the resolution of the touch panel, a distance between the neighboring propagation paths (i.e., an arrangement pitch of the comb electrodes) should be shortened. Then, the zigzag shape of the edge of the piezoelectric thin film 55 becomes finer, and higher accuracy in the process is required. Higher accuracy is also required in registration of the zigzag shape of the edge of the piezoelectric thin film 55 with the positions of the comb electrodes 53 and 54. As a result, yield may drop and manufacturing cost may increase.

SUMMARY OF THE INVENTION

An object of the present invention is to provide a touch panel device that can detect a touched position with sufficient resolution and accuracy without requiring high accuracy in the process for forming the piezoelectric thin film.

According to a first aspect of the present invention, a touch panel device comprises a non-piezoelectric substrate, a substantially rectangular touch area located in the middle portion of the non-piezoelectric substrate, a piezoelectric thin film located around the touch area, and plural pairs of transmission comb electrodes and reception comb electrodes of surface acoustic wave elements around the touch area. The plural transmission comb electrodes located along one of the neighboring sides of the touch area and the plural reception comb electrodes located along the other of the neighboring sides of the touch area constitute plural pairs, so that surface acoustic wave signals propagate from the transmission comb electrodes to the reception comb electrodes in a slanting direction with respect to four sides of the touch area. The piezoelectric thin film has a linear inside edge along the four sides of the touch area. A line along an electrode finger of the transmission comb electrode and a line along an electrode finger of the reception comb electrode are non-parallel with each other in accordance with an angle of refraction of the surface acoustic wave at a boundary between the piezoelectric thin film and the touch area.

In a preferred embodiment, the piezoelectric thin film is made of zinc oxide, and each of the comb electrodes is arranged so that the line along the electrode finger of the transmission comb electrode and the line along the electrode finger of the reception comb electrode are non-parallel with each other so as to open at the touch area side.

In another preferred embodiment, the piezoelectric thin film is made of aluminum nitride, and each of the comb electrodes is arranged so that the line along the electrode finger of the transmission comb electrode and the line along the electrode finger of the reception comb electrode are non-parallel with each other so as to intersect at the touch area side.

According to a second aspect of the present invention, a touch panel device comprises a non-piezoelectric substrate, a substantially rectangular touch area located in the middle portion of the non-piezoelectric substrate, and surface acoustic wave transmission elements and reception elements located around the touch area. Each of the elements includes a continuous comb electrode having a pair of parallel electrodes and comb electrode fingers extending from one of the parallel electrodes toward the other in a slanting direction at a constant pitch alternately and a piezoelectric thin film. The continuous comb electrode of the transmission element located along one of the neighboring sides of the touch area and the continuous comb electrode of the reception element located along the other of the neighboring sides of the touch area constitute a pair, so that surface acoustic wave signals propagate from the continuous comb electrode of the transmission element to the continuous comb electrode of the reception element in a slanting direction with respect to four sides of the touch area. The piezoelectric thin film has a linear inside edge along the four sides of the touch area. A line along a comb electrode finger of the transmission element and a line along a comb electrode finger of the reception element are non-parallel with each other in accordance with an angle of refraction of the surface acoustic wave at a boundary between the piezoelectric thin film and the touch area.

In a preferred embodiment, the piezoelectric thin film is made of zinc oxide, and each of the continuous comb electrodes is formed so that the line along the comb electrode finger of the transmission element and the line along the comb electrode finger of the reception element are non-parallel with each other so as to open at the touch area side.

In another preferred embodiment, the piezoelectric thin film is made of aluminum nitride, and each of the continuous comb electrodes is formed so that the line along the comb electrode finger of the transmission element and the line along the comb electrode finger of the reception element are non-parallel with each other so as to intersect at the touch area side.

According to each structure of the present invention, due to a difference of propagation speed of the surface acoustic wave between the area with the piezoelectric thin film and the area without the piezoelectric thin film (i.e., the touch area), the surface acoustic wave emitted from the comb electrode of the transmission element is first refracted in a certain direction at the boundary of the piezoelectric thin film and the touch area and is refracted again when entering the piezoelectric thin film of the reception element side from the touch area, so as to enter the comb electrode of the reception element perpendicularly. Thus, the surface acoustic wave can propagate efficiently from the transmission element to the reception element.

DESCRIPTION OF THE PREFERRED EMBODIMENTS

Hereinafter, the present invention will be explained more in detail with reference to embodiments and drawings.

Figure 1:
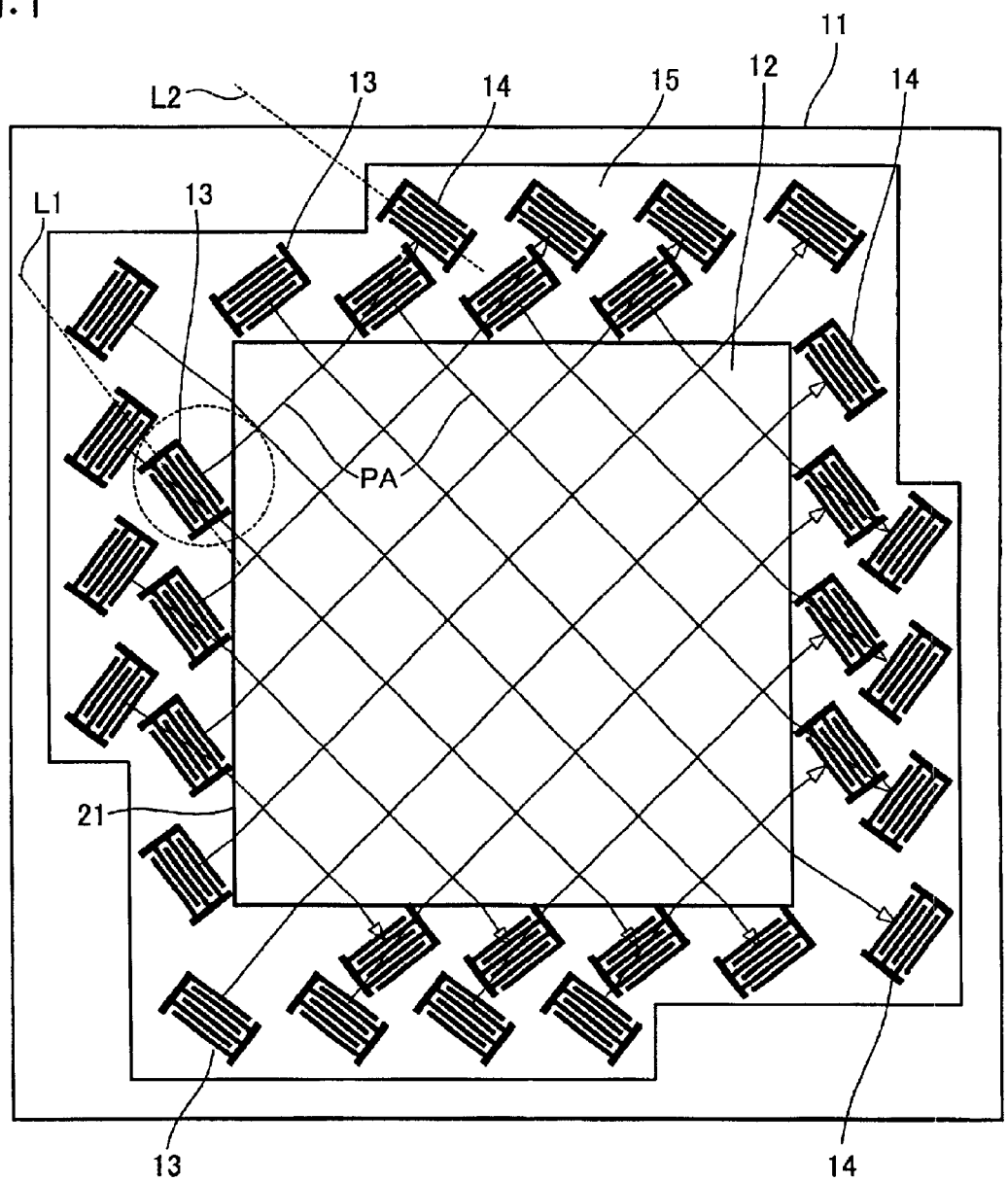
FIG. 1 shows a simplified structure of a touch panel device including a touch area and the periphery thereof according to a first embodiment of the present invention.

FIG. 1 shows a simplified structure of a touch panel device including a touch area and the periphery thereof according to a first embodiment of the present invention. On the middle portion of a glass substrate 11, a rectangular touch area 12 is provided, and plural pairs of comb electrodes 13 and 14 are arranged around the touch area 12. The comb electrode 13 makes up a SAW transmission element, while the comb electrode 14 makes up a SAW reception element.

Surface acoustic wave signals propagate in a slanting direction from the transmission comb electrodes 13 arranged along one side of the touch area 12 to the reception comb electrodes 14 arranged along the neighboring side, as shown by lines with arrows. In order to simplify the explanation, it is supposed that the touch area 12 is square, and the propagation paths (lines with arrows) PA of the surface acoustic wave signals are set in the direction of 45 degrees with respect to four sides of the touch area 12.

A piezoelectric thin film 15 is formed in the area of the comb electrodes 13 and 14 around the touch area 12. The piezoelectric thin film 15 is a zinc oxide (ZnO) thin film that covers the glass substrate (non-piezoelectric substrate) 11 and the comb electrodes 13 and 14 formed on the glass substrate. Alternatively, a piezoelectric thin film 15 is formed on the glass substrate 11, and the comb electrodes 13 and 14 are formed on the piezoelectric thin film 15.

When predetermined amplitude of excitation voltage is applied across the electrodes of the transmission comb electrode 13, a surface acoustic wave signal is generated. This surface acoustic wave signal propagates on the surface of the touch area 12 in the middle portion of the substrate 11 from the piezoelectric thin film 15 in a slanting direction along the propagation path PA shown by the line with the arrow. The reception element that includes a comb electrode 14 opposing the comb electrode 13 and the piezoelectric thin film 15 receives the surface acoustic wave signal, and the comb electrode 14 outputs a reception voltage signal. In the example shown in FIG. 1, 16 pairs of comb electrodes 13 and 14 are arranged around the touch area 12, and 16 (8×2) propagation paths PA cross the touch area 12 in a grid manner.

If a finger touches a certain position on the surface of the touch area 12 where the propagation paths PA of the surface acoustic wave signals cross, the propagation of the surface acoustic wave signal is intercepted. As a result, the amplitude of the reception voltage signal obtained from the comb electrode 14 of the reception element is attenuated substantially. In the example shown in FIG. 1, a touched position can be detected for 40 positions, which are intersections of eight propagation paths from the upper left sides to the lower right sides and eight propagation paths from the lower left sides to the upper right sides within the touch area 12. A detection circuit will be explained later.

Figure 10:
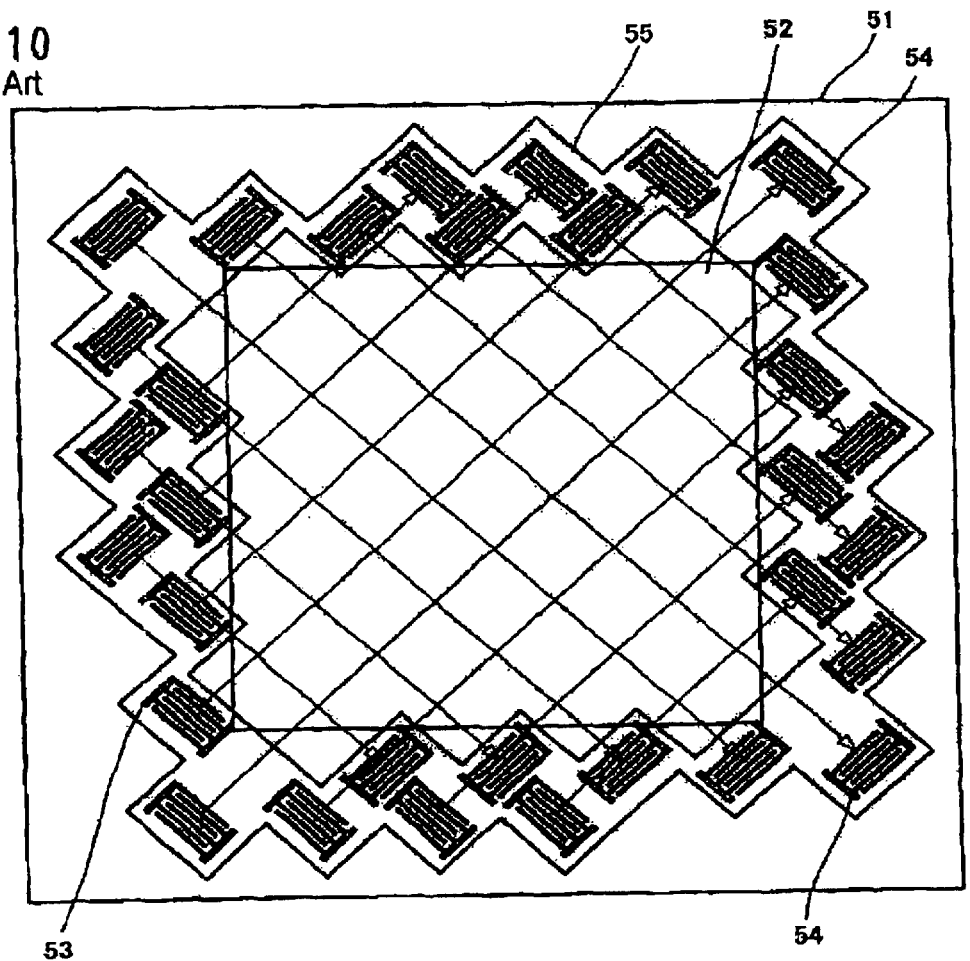
FIG. 10 shows a simplified structure of another conventional touch panel device utilizing a surface acoustic wave.

As shown in FIG. 1, the touch panel device of this embodiment has a linear inside edge of the piezoelectric thin film 15 along the four sides of the touch area 12 instead of the zigzag edge in the conventional touch panel device shown in FIG. 10. In addition, the opposing comb electrodes 13 and 14 are arranged in non-parallel. In other words, a line L1 along the electrode finger of the transmission comb electrodes 13 and a line L2 along the electrode finger of the reception comb electrodes 14 are non-parallel with each other so as to open at the touch area 12 side. By this structure, the surface acoustic wave emitted from the comb electrode 13 of the transmission element is refracted at the boundary between the edge of the piezoelectric thin film 15 and the touch area 12 (the area of only the glass substrate 11) and is refracted again when entering the piezoelectric thin film 15 of the reception element side from the touch area 12, so as to enter the comb electrode 14 of the reception element perpendicularly. Thus, efficiency of receiving the surface acoustic wave signal by the piezoelectric thin film 15 of the reception element side is not attenuated.

In this embodiment, the piezoelectric thin film 15 is made of zinc oxide (ZnO). In this case, the propagation speed of the surface acoustic wave is faster in the area with the piezoelectric thin film 15 than in the area without the piezoelectric thin film 15 (the touch area 12 of only the glass substrate). Therefore, refraction of the surface acoustic wave is generated at the boundary between the area with the piezoelectric thin film 15 and the area without the piezoelectric thin film 15 (touch area 12), and the direction of the refraction is like the propagation path PA shown by the line with the arrow in FIG. 1.

Therefore, the comb electrodes 13 and 14 are arranged so that the line L1 along the electrode finger of the transmission comb electrodes 13 and a line L2 along the electrode finger of the reception comb electrodes 14 are non-parallel with each other so as to open at the touch area 12 side. Thus, the surface acoustic wave signal emitted from the transmission element (comb electrode 13) is received by the reception element (comb electrode 14) efficiently with little loss despite of the generation of the above-mentioned refraction.

Next, an appropriate angle between the line L1 along the electrode finger of the transmission comb electrode 13 and the line L2 along the electrode finger of the reception comb electrode 14 will be explained. In order to simplify the explanation, it is supposed that the comb electrodes 13 and the corresponding comb electrodes 14 are inclined at the same angle α from parallel in the opposite direction with each other, so that the angle between the line L1 along the electrode finger of the transmission comb electrode 13 and the line L2 along the electrode finger of the reception comb electrode 14 is 2α.

Figure 2:
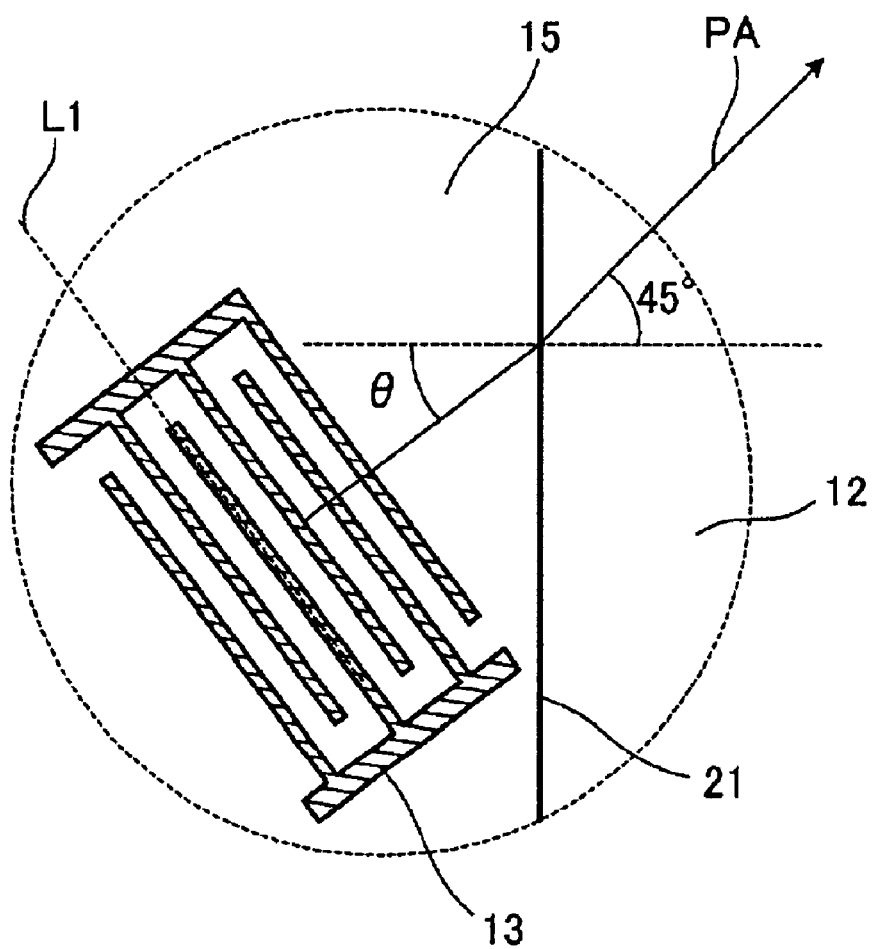
FIG. 2 is an enlarged diagram of a comb electrode located at the left side of the touch area and the periphery thereof shown in FIG. 1.

FIG. 2 is an enlarged diagram of a comb electrode 13 located at the left side of the touch area 12 and the periphery thereof (the area encircled by the broken line) shown in FIG. 1. FIG. 2 shows the condition where the propagation path PA of the surface acoustic wave emitted from the comb electrode 13 is refracted at the boundary 21 between the area with the piezoelectric thin film 15 and the area without the piezoelectric thin film 15 (in the left side of the touch area 12). The outgoing angle after refraction is 45 degrees, and the propagation speed of the surface acoustic wave is slower on the piezoelectric thin film 15 made of zinc oxide than in the area of only the glass substrate (i.e., the touch area 12). Therefore, the angle of incidence θ is smaller than 45 degrees.

Figure 3:
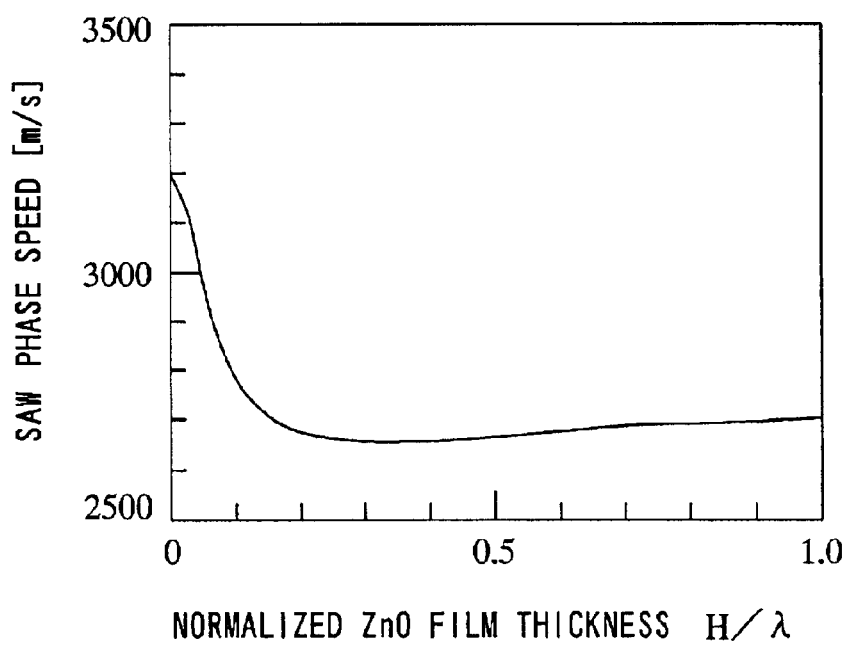
FIG. 3A is a graph showing the relationship between phase speed of the surface acoustic wave and normalized film thickness of the piezoelectric thin film made of zinc oxide.
FIG. 3B is a graph showing the relationship between an electromechanical coupling coefficient and the normalized film thickness.
Figure 3:
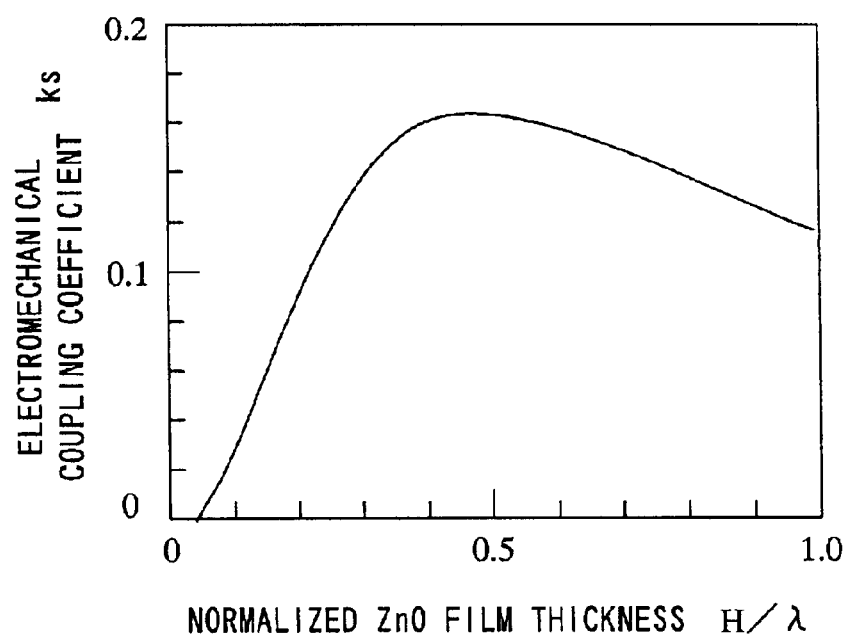

FIG. 3A is a graph showing the relationship between phase speed (m/s) of the surface acoustic wave and normalized film thickness of the piezoelectric thin film 15 made of zinc oxide (ZnO). The normalized film thickness is the quotient (H/λ) of film thickness H divided by wavelength λ. FIG. 3B is a graph showing the relationship between an electromechanical coupling coefficient ks and the normalized film thickness H/λ. As shown in FIG. 3B, the electromechanical coupling coefficient ks has the maximum value when the normalized film thickness H/λ is 0.4–0.5, which means the most efficient transmission and reception of the surface acoustic wave. In this case, the phase speed (propagation speed) of the surface acoustic wave in the area with the piezoelectric thin film 15 is approximately 2700 m/s as shown in FIG. 3A, while it is approximately 3200 m/s in the area of only glass substrate 11 without piezoelectric thin film 15 (touch area 12).

From the difference between the above-mentioned two propagation speeds, the angle of incidence θ is derived to be approximately 36.6 degrees in FIG. 2. Therefore, the comb electrode 13 (i.e., the line L1 along the electrode finger of the comb electrode 13) should be inclined approximately 7.4 degrees with respect to 45 degrees. Namely, the above-mentioned angle α is set to 7.4 degrees, so that the angle 2α between the line L1 along the electrode finger of the comb electrode 13 and the line L2 along the electrode finger of the comb electrode 14 is set to approximately 14.8 degrees. In this condition, the transmission of the surface acoustic wave from the comb electrode 13 of the transmission element to the comb electrode 14 of the reception element is performed most efficiently.

If the touch area 12 is oblong, the propagation paths PA are set in the direction along the diagonal, so the angles between the propagation path PA and the four sides of the touch area 12 are not 45 degrees. However, also in this case, if the comb electrodes 13 and the corresponding comb electrodes 14 are inclined at the same angle α from parallel in the opposite direction with each other, efficiencies of transmission and reception of the surface acoustic wave become maximum.

Figure 4:
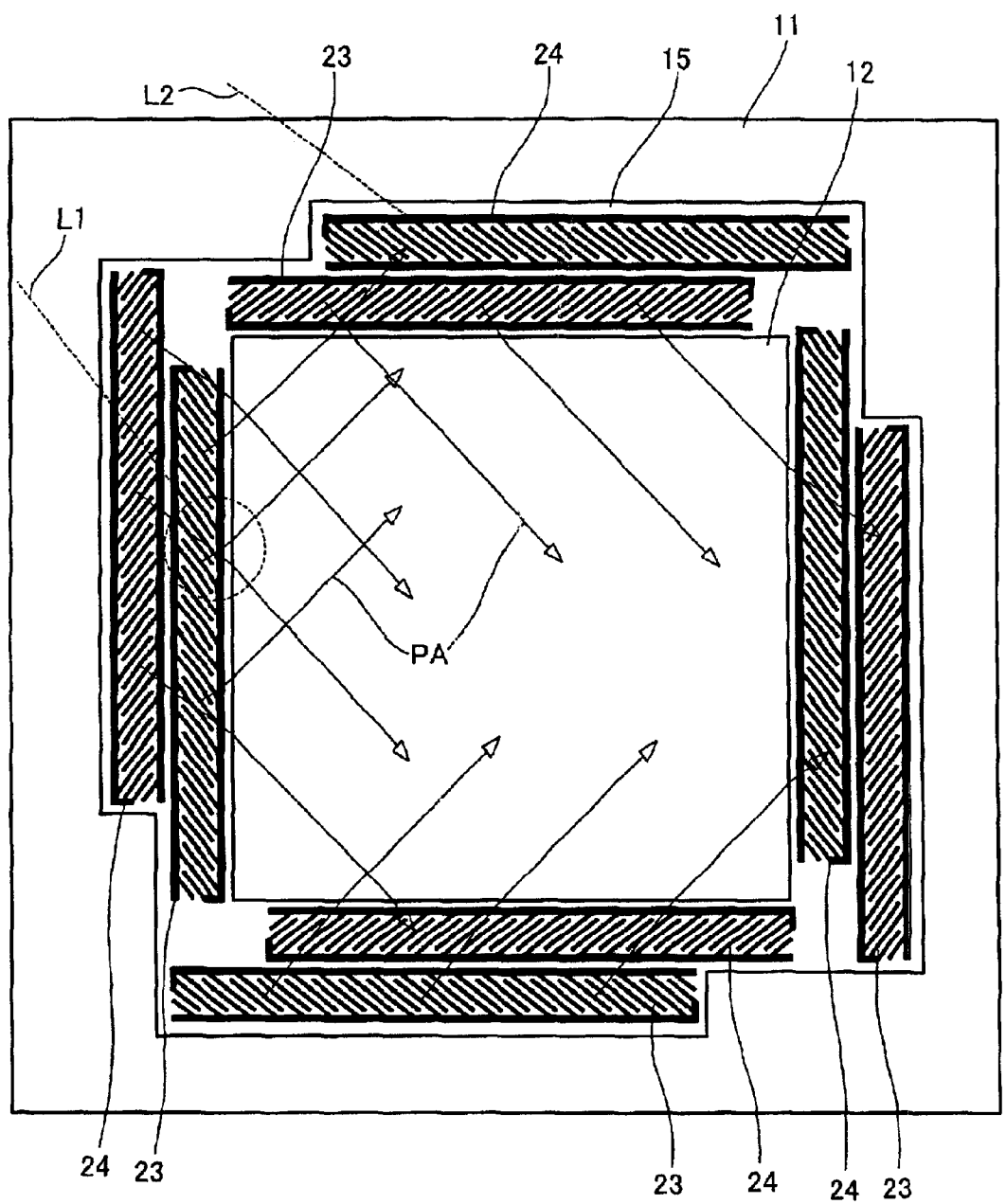
FIG. 4 shows a simplified structure of a touch panel device including a touch area and the periphery thereof according to a second embodiment of the present invention.

FIG. 4 shows a simplified structure of a touch panel device including a touch area and the periphery thereof according to a second embodiment of the present invention. In this embodiment, unlike the first embodiment shown in FIG. 1, so-called continuous comb electrodes 23 and 24 are used. Outside the touch area 12, a continuous comb electrode 23 of the transmission element and a continuous comb electrode 24 of the reception element are placed along each of the four sides of the touch area 12.

Figure 5:
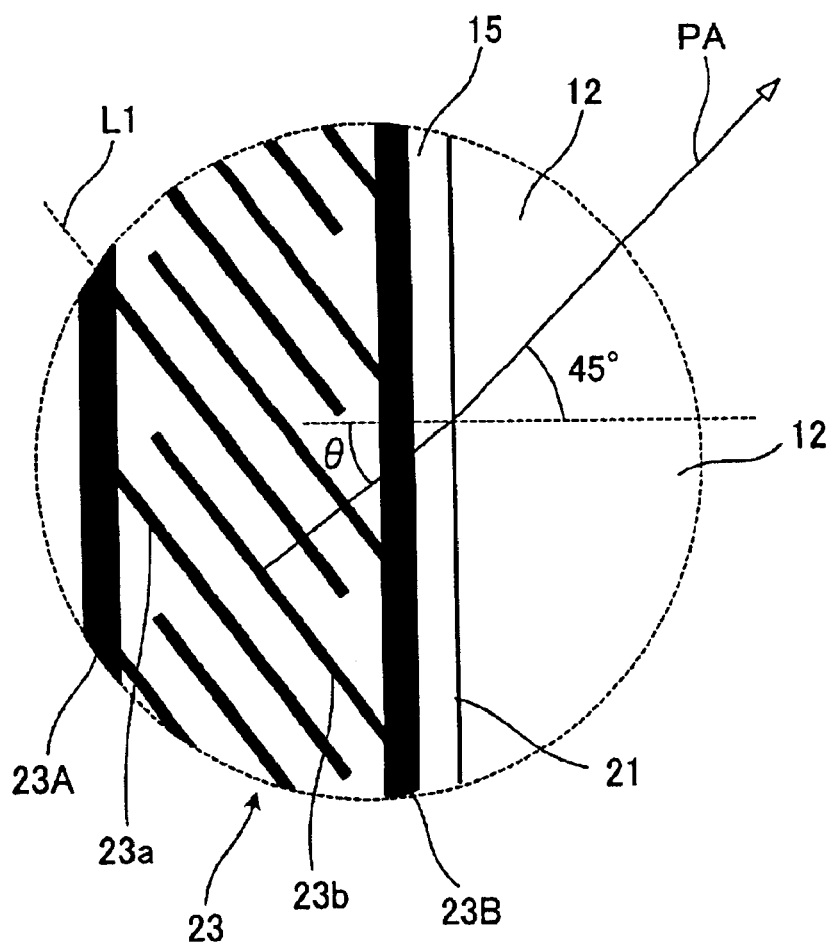
FIG. 5 is an enlarged diagram of a part of the continuous comb electrode of the transmission element located along the left side of the touch area in FIG. 4.

Each of the continuous comb electrodes 23 and 24 has a pair of parallel electrodes and electrode fingers extending from one of the parallel electrodes toward the other in a slanting direction at a constant pitch alternately. FIG. 5 is an enlarged diagram of a part of the continuous comb electrode 23 (a part encircled by the broken line) of the transmission element located along the left side of the touch area 12 in FIG. 4. As shown in FIG. 5, 23A and 23B denote a pair of parallel electrodes, while 23a and 23b denote electrode fingers extending from one of the parallel electrodes in a slanting direction.

In the case where the discrete comb electrodes 13 and 14 shown in FIG. 1 are used, the transmission comb electrodes 13 can be excited separately, and the reception voltage signal can be obtained separately from each of the corresponding reception comb electrodes 14. On the contrary, in the case of the continuous comb electrodes 23 and 24 shown in FIG. 4, every electrode finger emits the surface acoustic wave signal simultaneously and perpendicularly when an excitation voltage is applied across the common parallel electrodes of the continuous comb electrode 23 of the transmission element. Then, any part of the continuous comb electrode 24 of the reception element can receive the surface acoustic wave signal and generates the reception voltage signal between the common parallel electrodes. However, as mentioned above, the difference of the propagation time between the propagation paths PA crossing the touch area 12 in the slanting direction (in the diagonal direction) can be utilized for detecting the touched position. A detection circuit will be explained later.

In FIG. 4, a piezoelectric thin film 15 is formed in the area with the continuous comb electrodes 23 and 24. The piezoelectric thin film 15 is zinc oxide (ZnO) thin film. The piezoelectric thin film 15 covers the glass substrate (non-piezoelectric substrate) 11 and the continuous comb electrodes 23 and 24 formed on the glass substrate 11. Alternatively, the piezoelectric thin film 15 is formed on the glass substrate 11, and the continuous comb electrodes 23 and 24 are formed on the piezoelectric thin film 15.

Also in this embodiment, electrode fingers of the opposing continuous comb electrodes 23 and 24 (e.g., continuous comb electrode 23 of the transmission element located along the left side and the continuous comb electrode 24 of the reception element located on the upper side) are non-parallel. In other words, each of the electrode fingers is slanted from the angle of 45 degrees with respect to the four sides of the touch area 12. In the same way as explained in the first embodiment, the line L1 along the electrode finger of the continuous comb electrode 23 of the transmission element and the line L2 along the electrode finger of the continuous comb electrode 24 of the reception element are non-parallel with each other so as to open at the touch area 12 side, in accordance with the angle of refraction at the boundary between the area with piezoelectric thin film 15 made of zinc oxide and the area of only the glass substrate 11 due to the difference of propagation speeds.

Moreover, as shown in the enlarged diagram of FIG. 5, at the boundary 21 between the area with the piezoelectric thin film 15 and the area without the piezoelectric thin film 15 (in the left side of the touch area 12), the angle of incidence θ of the propagation path PA is smaller than 45 degrees when the outgoing angle after refraction is 45 degrees. The appropriate value of the angle of incidence θ is approximately 36.6 degrees in the same way as the first embodiment. In this case, the line L1 along the electrode finger 23a of the continuous comb electrode 23 of the transmission element is inclined at α=7.4 degrees from 45 degrees with respect to the left side 21 of the touch area 12. The L2 along the comb electrode finger of the opposing continuous comb electrode 24 of the reception element is inclined in the opposite direction at the same angle α, so that the angle 2α between the lines L1 and L2 along the comb electrode fingers of the continuous comb electrodes 23 and 24 becomes 14.8 degrees. Thus, in the same way as the first embodiment, efficiencies of transmission and reception of the surface acoustic wave become maximum.

Figure 6:
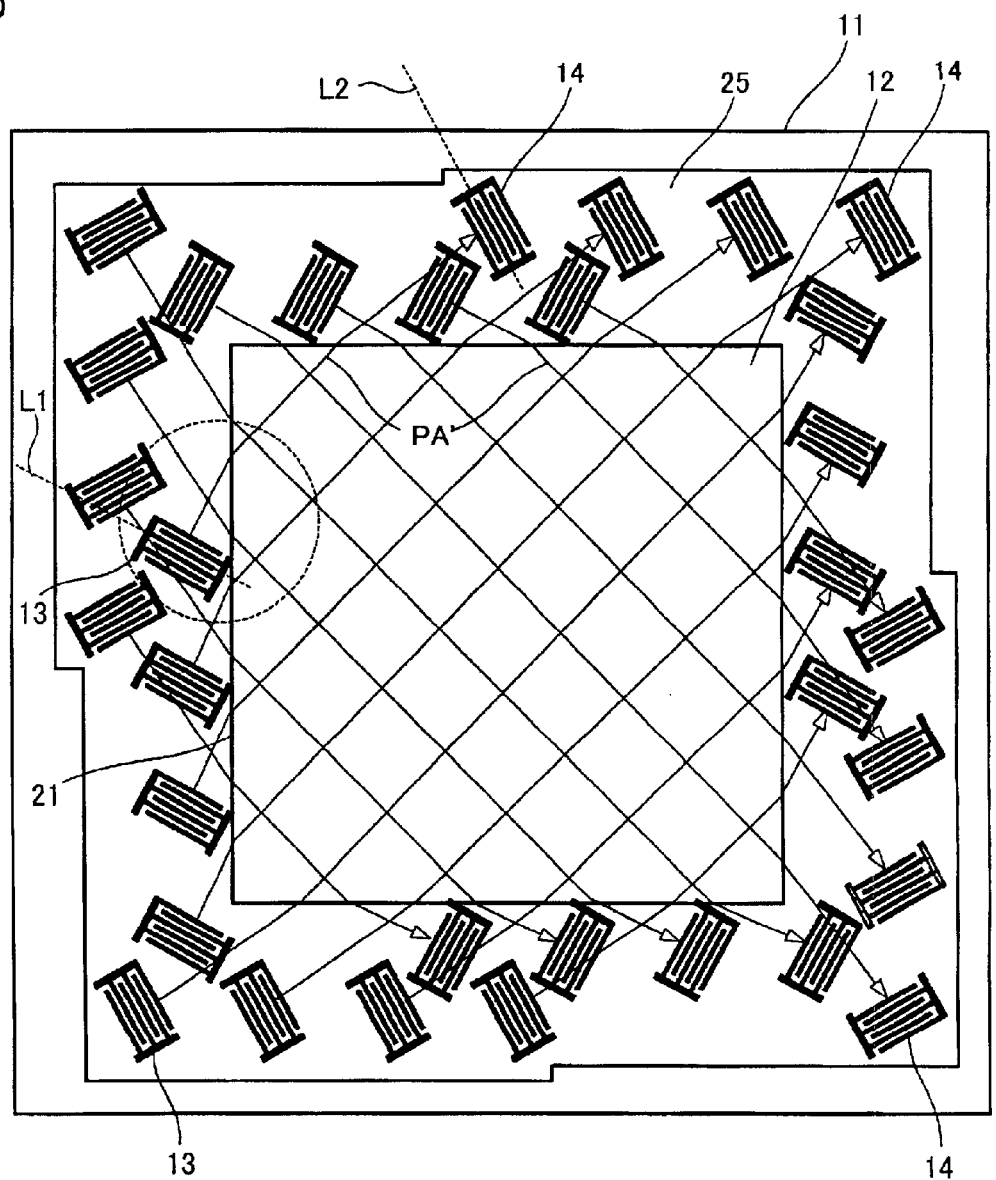
FIG. 6 shows a simplified structure of a touch panel device including a touch area and the periphery thereof according to a third embodiment of the present invention.

FIG. 6 shows a simplified structure of a touch panel device including a touch area and the periphery thereof according to a third embodiment of the present invention. In this embodiment, a piezoelectric thin film 25 is made of aluminum nitride (AlN). Unlike the piezoelectric thin film 15 made of zinc oxide in the first embodiment, the propagation speed of the surface acoustic wave is faster on the piezoelectric thin film 25 made of aluminum nitride than on the surface of the glass substrate 11. As a result, the refraction direction of the propagation path PA' at the boundary between the area with the piezoelectric thin film 25 and the area without the piezoelectric thin film 25 (e.g., in the left side 21 of the touch area 12) in FIG. 6 becomes opposite to that in FIG. 1.

Therefore, in the structure shown in FIG. 6, the comb electrodes 13 and 14 are arranged so that the line L1 along the electrode finger of the transmission comb electrode 13 and the line L2 along the electrode finger of the reception comb electrode 14 are non-parallel and intersect each other at the touch area 12 side. Thus, the surface acoustic wave signal is transmitted efficiently from the transmission element (comb electrode 13) to the reception element (comb electrode 14).

Figure 7:
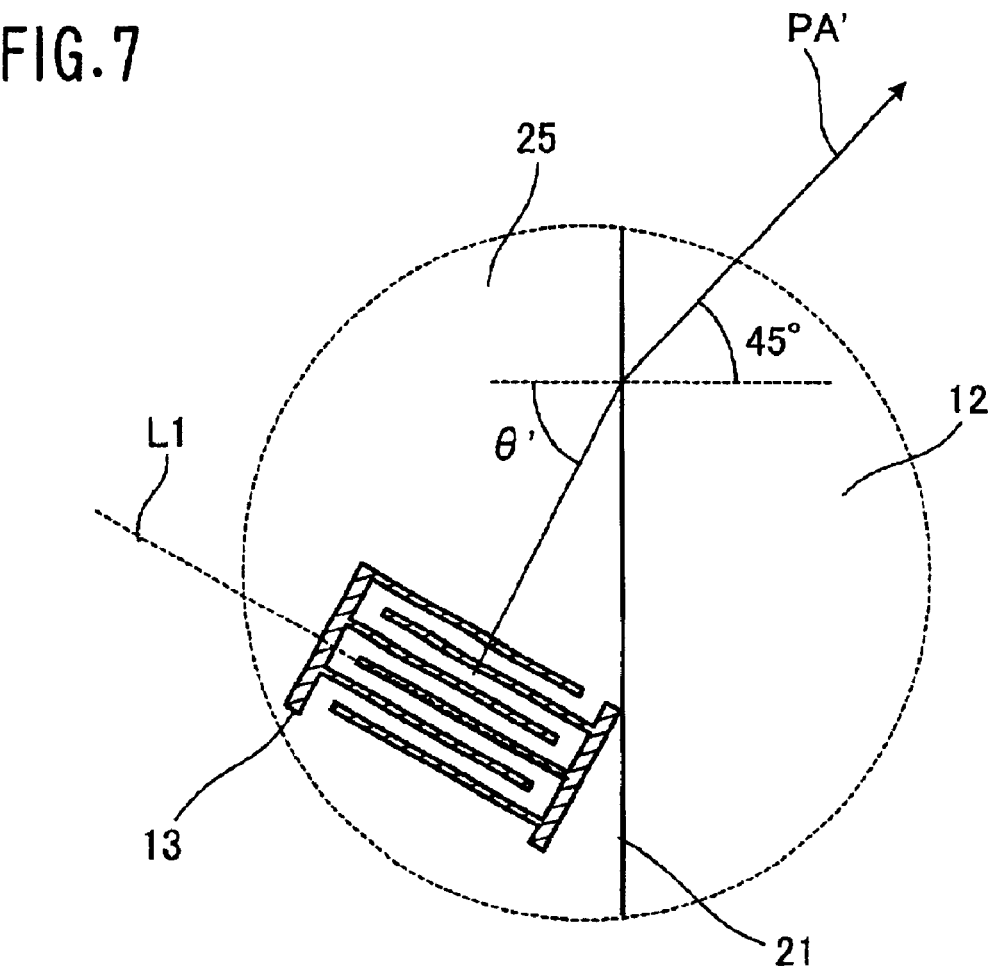
FIG. 7 is an enlarged diagram of a comb electrode located at the left side of the touch area and its periphery shown in FIG. 6.

FIG. 7 is an enlarged diagram of a comb electrode 13 located at the left side of the touch area 12 and its periphery (the area encircled by the broken line) shown in FIG. 6. FIG. 7 shows the condition where the propagation path PA' of the surface acoustic wave emitted from the comb electrode 13 is refracted at the boundary 21 between the area with the piezoelectric thin film 25 and the area without the piezoelectric thin film 25 (in the left side of the touch area 12). The outgoing angle after refraction is 45 degrees, and the propagation speed of the surface acoustic wave is faster on the piezoelectric thin film 25 made of aluminum nitride than in the area of only the glass substrate (i.e., the touch area 12). Therefore, the angle of incidence θ is larger than 45 degrees.

Supposing that the propagation speed of the surface acoustic wave on the piezoelectric thin film 25 made of aluminum nitride is 4400 m/s, and the propagation speed in the area of only the glass substrate 11 (i.e., the touch area 12) is 3200 m/s, for example, the angle of incidence θ is approximately 76.5 degrees. Therefore, the line L1 along the electrode finger of the comb electrode 13 should be inclined at approximately 31.5 degrees from 45 degrees. The line L2 along the electrode finger of the reception comb electrode 14 should be inclined at the same angle in the opposite direction. Thus, the angle between the line L1 and the line L2 should be set to 63 degrees. In this condition, the transmission efficiency of the surface acoustic wave from the comb electrode 13 of the transmission element to the comb electrode 14 of the reception element becomes maximum.

Furthermore, as a fourth embodiment, in the structure as described in the second embodiment (FIG. 4) using the continuous comb electrodes 23 and 24, the piezoelectric thin film made of aluminum nitride can be used in the same way as the third embodiment. In this case, the continuous comb electrodes 23 and 24 are formed so that the line L1 along the electrode finger of the continuous comb electrode 23 of the transmission element and the line L2 along the electrode finger of the continuous comb electrode 24 of the reception element are non-parallel and intersect each other in the touch area 12 side. Thus, the surface acoustic wave signal is transmitted efficiently from the transmission element to the reception element.

Figure 8:
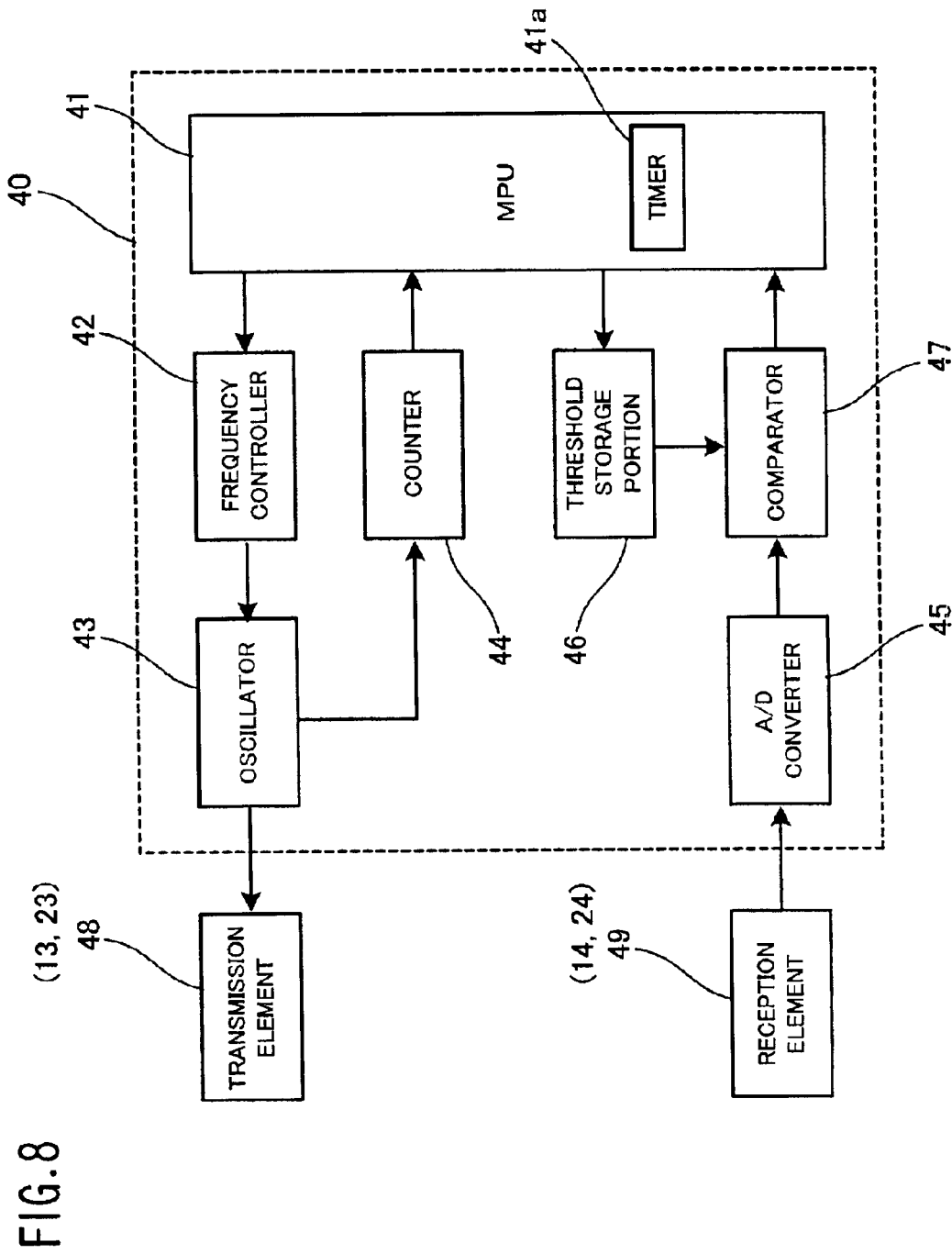
FIG. 8 is a block diagram of a detection circuit that is used for the touch panel device.
Figure 9:
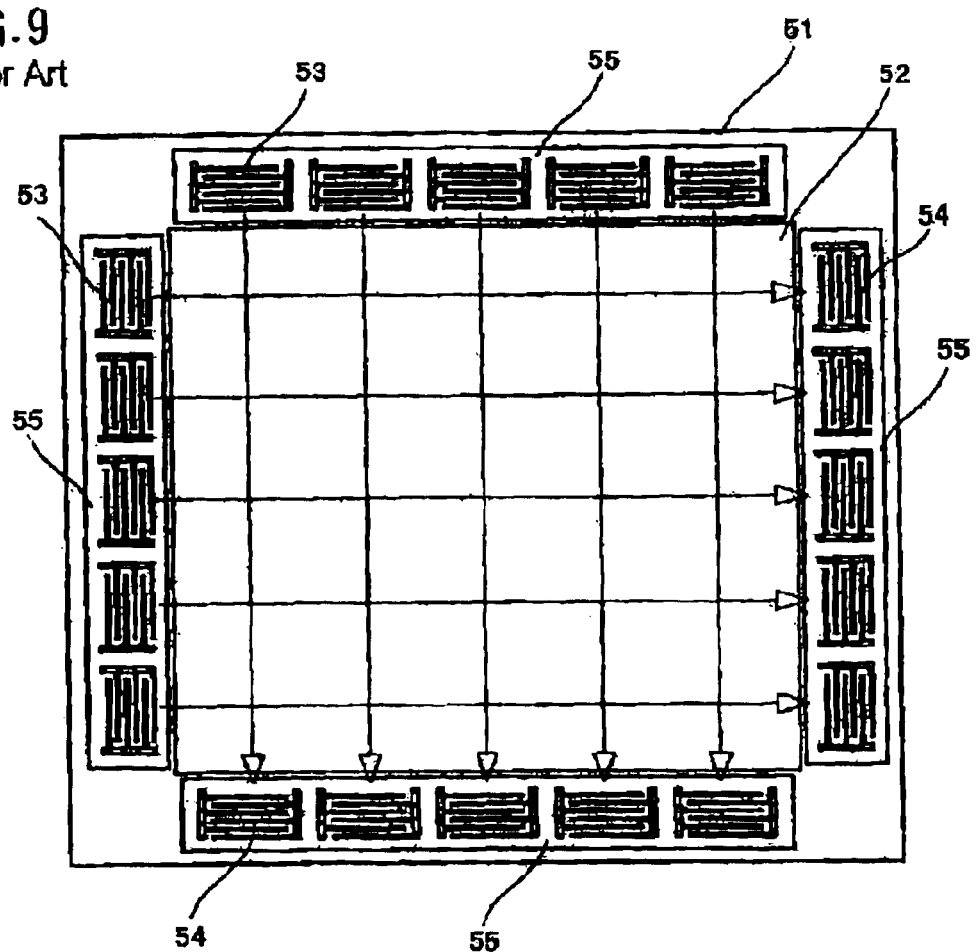
FIG. 9 shows a simplified structure of a conventional touch panel device utilizing a surface acoustic wave.

FIG. 8 is a block diagram of a detection circuit that is used for the touch panel device in each of the above-mentioned embodiments. The detection circuit 40 includes a driving circuit for applying an excitation voltage signal to the transmission element 48 including the comb electrode 13 (or the continuous comb electrode 23) and a signal process circuit for processing the reception voltage signal that is outputted from the reception element 49 including the comb electrode 14 (or the continuous comb electrode 24).

The detection circuit 40 includes a microprocessor (MPU) 41, a frequency controller 42, an oscillator 43, a counter 44, an A/D converter 45, a threshold storage portion 46 and a comparator 47. The frequency controller 42, the oscillator 43 and the counter 44 make up the driving circuit, and the oscillator 43 is connected to the transmission element 48. In addition, the A/D converter 45, the threshold storage portion 46 and the comparator 47 make up the signal process circuit, and the A/D converter 45 is connected to the reception element 49. The MPU 41 controls the entire of the detection circuit 40 and includes a timer 41a.

The frequency controller 42 controls the excitation frequency responding to an instruction of the MPU 41. The oscillator 43 oscillates at the frequency responding to the voltage given by the frequency controller 42, and the generated burst voltage (the excitation voltage) is applied to the transmission element 48. Thus, the transmission element 48 emits the surface acoustic wave. The counter 44 counts the number of oscillation times in the oscillator 43, i.e., the number of waves of the burst voltage, which is fed back to the MPU 41.

When the surface acoustic wave emitted from the transmission element 48 is received by the reception element 49, the reception voltage signal is outputted from the reception element 49 and is sampled by the A/D converter 45. The sampled value is given to the comparator 47, which compares the sampled value with the threshold value stored in the threshold storage portion 46. The comparison result is given to the MPU 41.

The MPU 41 decides whether the touch area 12 is touched or not and specifies the touched position in accordance with the comparison result given by the comparator 47. In the cases where the discrete comb electrodes 13 and 14 shown in FIGS. 1 and 6 are used for the transmission element 48 and the reception element 49, the comparison result given from the comparator 47 can be recognized for each of the plural comb electrodes 14 of the reception elements 49. Therefore, it is easy to decide which propagation path PA (or PA') is touched. In the cases where the continuous comb electrodes 23 and 24 shown in FIG. 4 are used for the transmission element 48 and the reception element 49, the built-in timer 41a is used for measuring time from transmission (excitation) to reception, so as to decide which propagation path PA is touched in accordance with the difference of the propagation time between the propagation paths PA.

Though some embodiments of the present invention are explained in the above description, these embodiments can be modified if necessary. For example, though the touch area 12 is square in the above-explained embodiments, the present invention can be applied to the case where the touch area 12 is oblong. In this case, as mentioned above, the propagation paths PA may be arranged in the direction along the diagonal of the oblong.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A touch panel device comprising:
   a non-piezoelectric substrate;
   a substantially rectangular touch area located in the middle portion of the non-piezoelectric substrate;
   a piezoelectric thin film located around the touch area;
   plural pairs of transmission comb electrodes and reception comb electrodes of surface acoustic wave elements around the touch area, the plural transmission comb electrodes located along one of the neighboring sides of the touch area and the plural reception comb electrodes located along the other of the neighboring sides of the touch area constituting plural pairs, so that surface acoustic wave signals propagate from the transmission comb electrodes to the reception comb electrodes in a slanting direction with respect to four sides of the touch area;
   the piezoelectric thin film having a linear inside edge along the four sides of the touch area; and
   a line along an electrode finger of the transmission comb electrode and a line along an electrode finger of the reception comb electrode being non-parallel with each other in accordance with an angle of refraction of the surface acoustic wave at a boundary between the piezoelectric thin film and the touch area.

2. The touch panel device according to claim 1, wherein the piezoelectric thin film is made of zinc oxide, and each of the comb electrodes is arranged so that the line along the electrode finger of the transmission comb electrode and the line along the electrode finger of the reception comb electrode are non-parallel with each other so as to open at the touch area side.

3. The touch panel device according to claim 1, wherein the piezoelectric thin film is made of aluminum nitride, and each of the comb electrodes is arranged so that the line along the electrode finger of the transmission comb electrode and the line along the electrode finger of the reception comb electrode are non-parallel with each other so as to intersect at the touch area side.

4. A touch panel device comprising:

a non-piezoelectric substrate;

a substantially rectangular touch area located in the middle portion of the non-piezoelectric substrate;

surface acoustic wave transmission elements and reception elements located around the touch area, each of the elements including a continuous comb electrode having a pair of parallel electrodes and comb electrode fingers extending from one of the parallel electrodes toward the other in a slanting direction at a constant pitch alternately and a piezoelectric thin film;

the continuous comb electrode of the transmission element located along one of the neighboring sides of the touch area and the continuous comb electrode of the reception element located along the other of the neighboring sides of the touch area constituting a pair, so that surface acoustic wave signals propagate from the continuous comb electrode of the transmission element to the continuous comb electrode of the reception element in a slanting direction with respect to four sides of the touch area;

the piezoelectric thin film having a linear inside edge along the four sides of the touch area; and a line along a comb electrode finger of the transmission element and a line along a comb electrode finger of the reception element being non-parallel with each other in accordance with an angle of refraction of the surface acoustic wave at a boundary between the piezoelectric thin film and the touch area.

5. The touch panel device according to claim 4, wherein the piezoelectric thin film is made of zinc oxide, and each of the continuous comb electrodes is formed so that the line along the comb electrode finger of the transmission element and the line along the comb electrode finger of the reception element are non-parallel with each other so as to open at the touch area side.

6. The touch panel device according to claim 4, wherein the piezoelectric thin film is made of aluminum nitride, and each of the continuous comb electrodes is formed so that the line along the comb electrode finger of the transmission element and the line along the comb electrode finger of the reception element are non-parallel with each other so as to intersect at the touch area side.

* * * * *